US009219709B2

(12) United States Patent
Lindteigen

(10) Patent No.: US 9,219,709 B2
(45) Date of Patent: Dec. 22, 2015

(54) MULTI-WRAPPED VIRTUAL PRIVATE NETWORK

(71) Applicant: Ty Brendan Lindteigen, Chandler, AZ (US)

(72) Inventor: Ty Brendan Lindteigen, Chandler, AZ (US)

(73) Assignee: SAIFE, INC.AZ (US)

( * ) Notice: Subject to any disclaimer, the term of this patent is extended or adjusted under 35 U.S.C. 154(b) by 216 days.

(21) Appl. No.: 13/850,282

(22) Filed: Mar. 25, 2013

(65) Prior Publication Data

US 2013/0340067 A1   Dec. 19, 2013

Related U.S. Application Data

(60) Provisional application No. 61/616,409, filed on Mar. 27, 2012.

(51) Int. Cl.
H04L 29/06   (2006.01)

(52) U.S. Cl.
CPC .................................. *H04L 63/0272* (2013.01)

(58) Field of Classification Search
CPC ................................................. H04L 63/0272
See application file for complete search history.

(56) References Cited

U.S. PATENT DOCUMENTS

| | | | | |
|---|---|---|---|---|
| 6,081,900 A * | 6/2000 | Subramaniam et al. | ........ | 726/19 |
| 6,272,639 B1 * | 8/2001 | Holden et al. | .................. | 726/12 |
| 2002/0004898 A1 * | 1/2002 | Droge | ........................... | 713/151 |
| 2002/0138565 A1 * | 9/2002 | Kustov et al. | ................. | 709/203 |
| 2004/0158705 A1 * | 8/2004 | Burdett et al. | ................ | 713/151 |
| 2005/0008160 A1 * | 1/2005 | Izawa et al. | .................... | 380/270 |
| 2005/0273850 A1 * | 12/2005 | Freund | ............................ | 726/14 |
| 2005/0278565 A1 * | 12/2005 | Frattura et al. | .................... | 714/5 |
| 2006/0174336 A1 * | 8/2006 | Chen | .............................. | 726/11 |
| 2006/0248581 A1 * | 11/2006 | Sundarrajan et al. | ........... | 726/12 |
| 2008/0126559 A1 * | 5/2008 | Elzur et al. | .................... | 709/232 |
| 2010/0077447 A1 * | 3/2010 | Dholakia et al. | ................. | 726/3 |
| 2010/0153742 A1 * | 6/2010 | Kuo et al. | ..................... | 713/189 |
| 2010/0250920 A1 * | 9/2010 | Chandrika | .................... | 713/152 |
| 2011/0276798 A1 * | 11/2011 | Liang et al. | .................. | 713/156 |
| 2012/0036552 A1 * | 2/2012 | Dare et al. | ........................ | 726/1 |
| 2012/0278878 A1 * | 11/2012 | Barkie et al. | .................... | 726/15 |
| 2013/0283045 A1 * | 10/2013 | Li et al. | ......................... | 713/160 |

* cited by examiner

*Primary Examiner* — Darren B Schwartz

(57) ABSTRACT

The invention includes a system for transmitting multi-wrapped VPN enabled-data across a communication network from a device to another destination device within a remote protected network. The device comprises a software stack, hardware layer, application-layer VPN software, link-layer VPN software, and user-based application software. Next, the device is coupled to a communication network. Next, the system includes a link-layer VPN aggregator and an application-layer VPN aggregator. Finally, the system includes a protected network that includes the destination device. The invention includes embodiments for configuring a device to transmit multi-wrapped VPN enabled-data and processes for transmitting multi-wrapped VPN enabled-data across a communication network from a device to another destination device within a remote protected network. Finally, the invention includes inverse processes so the destination device can transmit data back through the communication network and to the device.

16 Claims, 7 Drawing Sheets

FIG. 4
4000

4100
Transmit Data from the User-Based Software Application to the Application-Layer VPN Software

4200
Application-Layer VPN Software Encrypts Data

4300
Application-Layer VPN Software Sends the Encrypted Data to the Local Network Interface

4400
Link-Layer VPN Software Encrypts All Data Leaving the Device Via The Local Network Interface

4500
Link-Layer VPN Software Sends All Encrypted Data across the Communication Network

4600
Link-Layer VPN Aggregator Receives the Twice Encrypted Data and Inverses the Link-Layer VPN Software Encryption

4700
Link-Layer VPN Aggregator Filters Data & Sends Data to Next Destination

4800
Application-Layer VPN Aggregator Receives the Once Encrypted Data and Inverses the Application-Layer VPN Software Encryption

4900
Application-Layer VPN Aggregator Sends the Decrypted Data to the Protected Network

4950
Protected Network Routes the Decrypted Data to the Destination Device

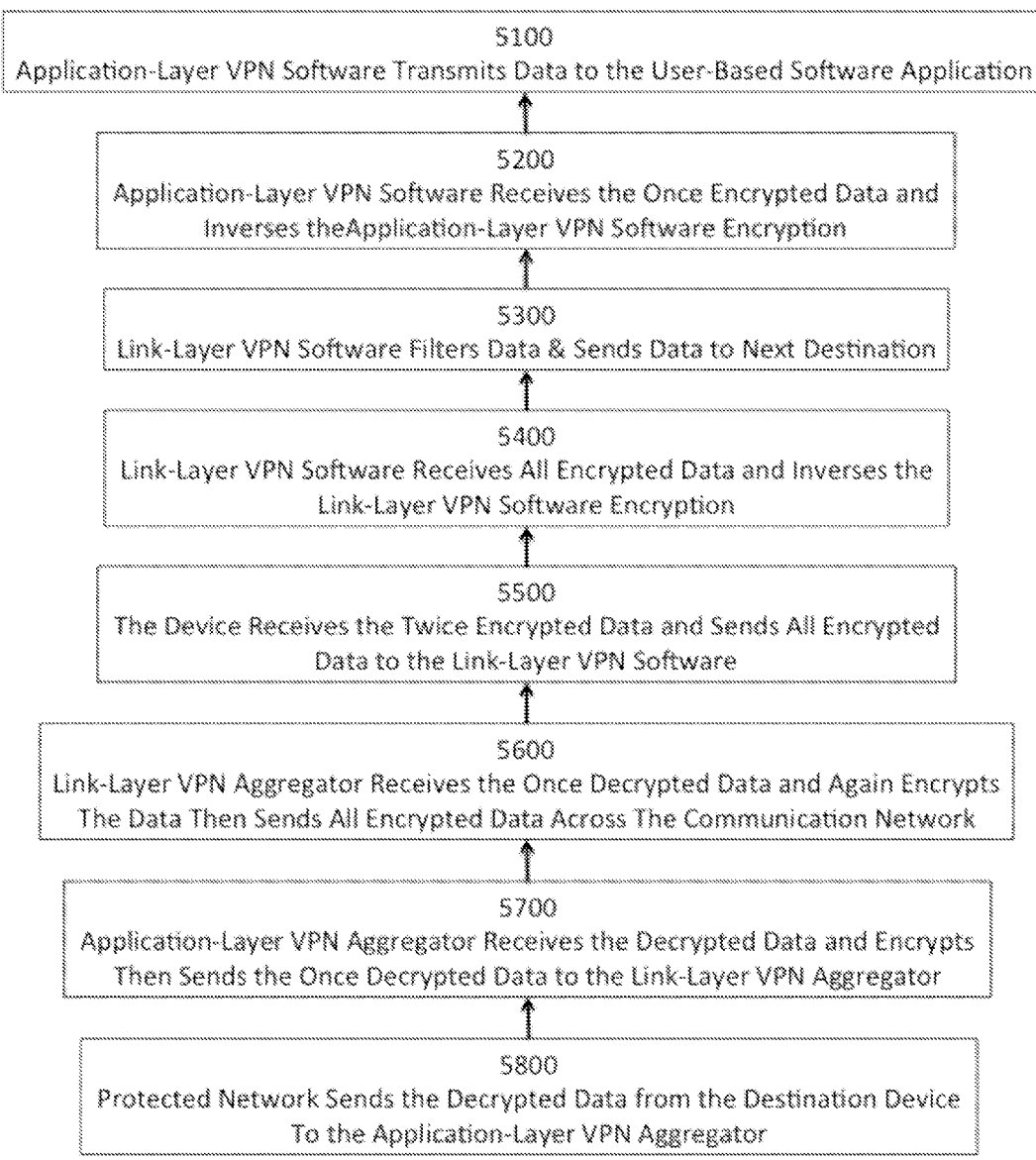

MULTI-WRAPPED VIRTUAL PRIVATE NETWORK

CROSS-REFERENCE TO RELATED APPLICATIONS

The present application is related to and claims priority from prior provisional application Ser. No. 61/616,409 filed Mar. 27, 2012 the contents of which are incorporated herein by reference.

FIELD OF THE INVENTION

This invention relates generally to the field of securing data, and particularly a method, apparatus, and system for encrypting and decrypting electronic data from non-secure applications while in transit via a communications network.

BACKGROUND OF THE INVENTION

People are heavily dependent on computing and communication devices to store, process, and transmit data across a vast system of communication networks. People all over the world use fixed and mobile computing and communication devices to perform personal and business tasks. Such use generates billions of data transmission each day via mobile and fixed communication devices such as smart phones, tablet PC's, notebook PC's, desktop PC's, or any other device that transmits data over a communication network.

Miscreants make tremendous efforts to maliciously attack such data during all phases of use including storage, processing, and transmission. Private, corporate, and government entities expend significant resources to protect sensitive data from malicious use. Certain government and military entities will benefit from enhanced commercially available data encryption applications. A multi-wrapped VPN is a system that will enhance commercially available data encryption tools, but such an invention has eluded various entities that have tried to develop a stable, successful solution.

An example where this issue is often encountered involves the use of devices that use the Android operating system. Android-based devices are limited in protecting electronic data because Android-based devices have limited virtual private network ("VPN") capabilities. The Android operating system requires that users have elevated permission levels such as root permissions to install or operate VPN capabilities. Hence, existing VPN solutions have limited use on Android-based devices.

This invention provides a novel method, apparatus, and system to protect data transmissions in a manner that is less cumbersome for the end user than existing solutions. This invention enables a multi-wrapped secure communication tunnel, or multi-wrapped VPN, on a communication device for secure transmissions over existing public or private communication networks. This invention is also compatible with the most prolifically used mobile communication devices and software.

BRIEF SUMMARY OF THE INVENTION

In one embodiment of the invention a system for transmitting multi-wrapped VPN enabled-data across a communication network from a device to a remote protected network comprises a device. The device comprises a software stack that may include application software, libraries, command line tools, virtual machines ("VM"), firmware, and operating systems. Next, the device may also comprise a hardware layer including storage, local interfaces, and remote interfaces. Next, the device may also include application-layer VPN software, link-layer VPN software, and other user-based application software. Next, the device is coupled to a communication network, such as the Internet, or any other public or private network. Next, the system includes a link-layer VPN aggregator and an application-layer VPN aggregator. Finally, the system includes a protected network that includes a destination device.

One embodiment of the invention is a process for configuring a device to transmit multi-wrapped VPN enabled-data across a communication network comprises installing a link-layer VPN software application to the device. Next the link-layer VPN software application is associated with a link-layer VPN aggregator. Next an application-layer VPN software application is installed onto the device. Next the application-layer VPN software application is associated with an application-layer VPN aggregator. Finally, the device can be used to transmit data across the communication network with the multi-wrapped VPN.

One embodiment of the invention is a process for transmitting multi-wrapped VPN enabled-data across a communication network from a communication device to a remote protected network comprises transmitting data from a local software application to an application-layer VPN software application. Next the application-layer VPN software encrypts the data. Next, the application-layer VPN software sends the encrypted data to the local network interface. Next, a link-layer VPN software application captures all data transmitted through the local network interface. Next, the link-layer VPN software encrypts all data packets leaving the device, including the data that was previously encrypted via the application-layer VPN software. Next, the link-layer VPN software sends the encrypted data across a communication network. Next, a link-layer VPN aggregator is coupled to the communication network. The link-layer VPN aggregator receives the encrypted data and inverses the encryption performed by the link-layer VPN software. Next, the link-layer VPN aggregator filters the data sending the completely decrypted data to its destination device and sends the data that was double-wrapped to the application-layer VPN aggregator. Next, the application-layer VPN aggregator receives the data that is still encrypted and inverses the encryption performed by the application-layer VPN software. Next, the application-layer VPN aggregator sends the decrypted data onto the private network to the destination device. Finally, the multi-wrapped data encryption process is reversible and the destination device can transmit data back through the communication network and to the device.

One embodiment of the invention is a process for transmitting multi-wrapped VPN enabled-data across a communication network from a communication device to a remote protected network comprising first transmitting data from a user-based software application to a link-layer VPN software application. The link-layer VPN software captures all data leaving the device and encrypts the data. The link-layer VPN software redirects all encrypted traffic to the application-layer VPN software application via a dedicated local port. The application-layer VPN software is only associated with a single local port on the network stack. The application-layer VPN software encrypts the data a second time. The application-layer VPN software sends the twice-encrypted data out of the network. The link-layer VPN software inspects the data to determine if the source is the application-layer VPN. Alternatively, the application-layer VPN sends the multi-encrypted data directly to the link-layer VPN software via a local port that detects all data incoming on the port associated with the application-layer VPN.

Next, the encrypted data is sent out of the network stack and across a communication network. Next, a link-layer VPN aggregator is coupled to the communication network. The link-layer VPN aggregator receives the encrypted data and inverses the encryption performed by the link-layer VPN software. Next, the link-layer VPN aggregator filters the data sending the completely decrypted data to its destination device and sends the data that was multi-wrapped to the application-layer VPN aggregator. Next, the application-layer VPN aggregator receives the data that is still encrypted and inverses the encryption performed by the application-layer VPN software. Next, the application-layer VPN aggregator sends the decrypted data onto the private network to the destination device. Finally, the double-wrapped data encryption process is reversible and the destination device can transmit data back through the communication network and to the device.

BRIEF DESCRIPTION OF THE DRAWINGS

Features and advantages of the claimed subject matter will be apparent from the following detailed description of embodiments consistent therewith, which description should be considered with reference to the accompanying drawings, wherein:

FIG. 4 is a diagram of an exemplary embodiment for a process for transmitting multi-wrapped VPN enabled-data across a communication network from a device to a remote protected network in accordance with the teachings of the present invention;

FIG. 5 is a diagram of an exemplary embodiment for a process for receiving multi-wrapped VPN enabled-data transmitted across a communication network to a communication device from a remote protected network in accordance with the teachings of this invention;

DETAILED DESCRIPTION OF THE INVENTION

The following describes the details of the invention. Although the following description will proceed with reference being made to illustrative embodiments, many alternatives, modifications, and variations thereof will be apparent to those skilled in the art. Accordingly, it is intended that the claimed subject matter be viewed broadly. Examples are provided as reference and should not be construed as limiting. The term "such as" when used should be interpreted as "such as, but not limited to."

Figure 1:
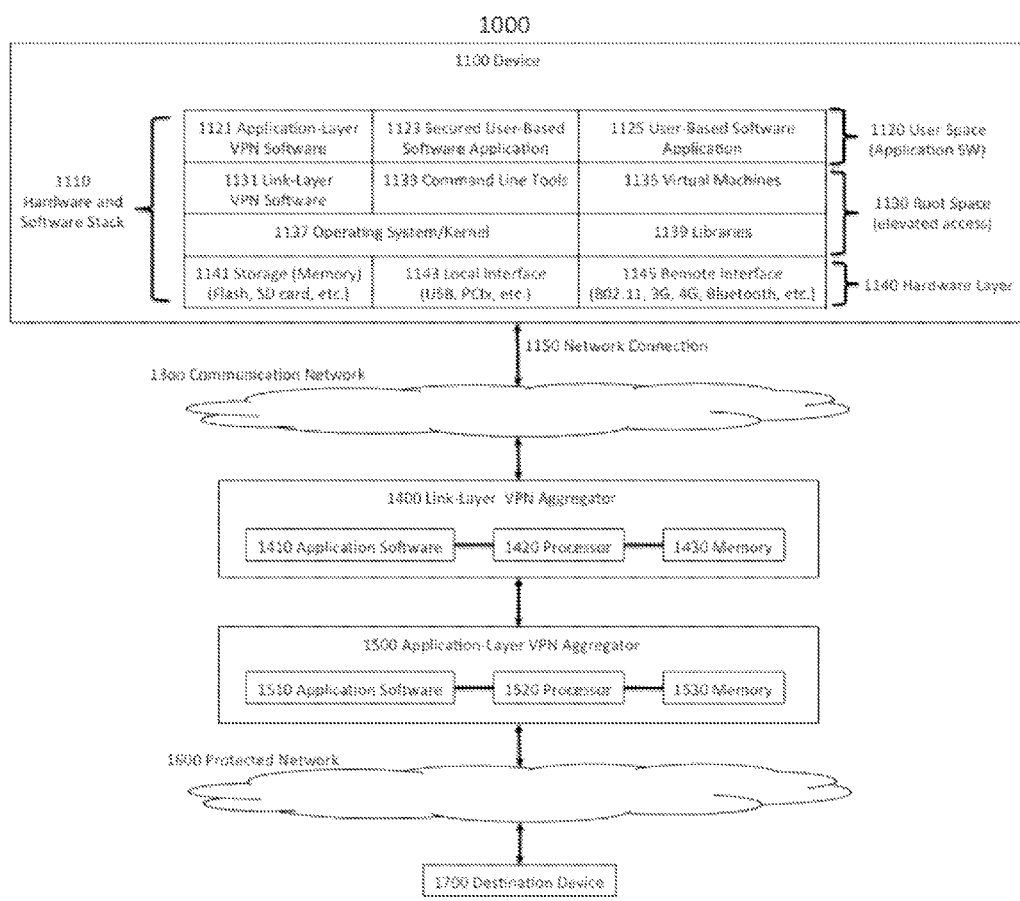
FIG. 1 is a diagram of an exemplary embodiment illustrating a system for establishing a multi-wrapped VPN to transmit data across a communication network from a device to a remote protected network in accordance with the teachings of the present invention.

FIG. 1 is a diagram of an exemplary embodiment for a system 1000 to transmit multi-wrapped VPN enabled-data across a communication network 1300 from a device 1100 to a remote protected network 1600 comprising a device 1100. The device 1100 may include a smart phone, tablet PC, notebook PC, desktop PC, remote monitoring device, camera, sensor, or any other device that transmits data across applications within the device, or transmits data out of the device. The device 1100 may be used for any type of communication, computing, or electronic operation. The invention is also applicable to both mobile and fixed devices since either type typically includes multiple software applications that transmit data to and from each other. Likewise mobile and fixed devices are commonly used to transmit data to and from other mobile and fixed devices.

Next the device 1100 comprises a hardware and software stack 1110 that may include user-based application software 1120, libraries 1139, command line tools 1133, virtual machines ("VM") 1135, and operating systems 1137. The device 1100 may also comprise a hardware layer 1140 including storage 1141, local interfaces 1143, and remote interfaces 1145.

Next, the device 1100 may also include application-layer VPN software 1121, link-layer VPN software 1131, and other user-based application software 1120. The user-based application software 1120 is installed within the device 1100 and coupled to the device's hardware and software stack 1110. For example, the user-based application software 1123 is installed within the user space 1120 of the device's software stack and associated with various hardware on the device 1100 such as data storage 1141, local interfaces 1143, and remote interfaces 1145.

The application-layer VPN software 1121 may be installed in either root 1130 or user space 1120; however it is more advantageous to exist in user space 1120 since root, or elevated access, is not required. Applications in user space 1120 can be installed, uninstalled, updated and configured more readily than applications installed in root space 1130.

The application-layer VPN software 1121 is configured to capture all data entering or leaving the memory space dedicated to a software application. The application-layer VPN software 1121 also includes cryptographic algorithms to encrypt data leaving the memory space dedicated to a software application, or decrypt data sent to the memory space for use with the application. The application-layer VPN software 1121 ensures that data is secure immediately upon processing by the application software and when stored or transferred from memory.

The link-layer VPN software 1131 typically exists in root space 1130, though it is possible to have the link-layer VPN software 1131 in the user space 1130. The link-layer VPN software 1131 is configured to capture all data entering or leaving the device 1100. The link-layer VPN software 1131 also includes cryptographic algorithms to encrypt all data leaving the device, or decrypt data sent to the device 1100. The link-layer VPN software 1121 ensures that data is secure during transit from the device to the communication network 1300.

Either VPN software may include a stand-alone module consisting of the necessary algorithm, data path, and hardware and associated software.

The user-based application software 1123 may include any type of software that stores, processes, or transmits data to other applications on the device, or to other devices such as internet browsers, email, word processing, gaming, data analysis, software applications. The user-based application software 1123 may also be a commercially available off-the shelf ("COTS") software application without an integrated data encryption capability. Such an application may include standard software applications such as Email, SIP-based VoIP clients, web browsers, video conferencing applications, or any other software application in which communicating data across a communication network is a function of the application.

Next, the device 1100 is coupled to a communication network 1300. The communication network 1300 may be a wired or wireless communication network. The communication network 1300 may include a public or private network such as the Internet, intranet, telecommunications system, or other network capable of transmitting data.

Next, the system 1000 includes a link-layer VPN aggregator 1400 and an application-layer VPN aggregator 1500. Each aggregator includes a cryptographic engine consisting of hardware and, or software that utilizes a data encryption algorithm to secure data from unauthorized access. The aggregators may include a stand-alone module consisting of the necessary memory 1430 and 1530 and control processors 1420 and 1520 and application software 1410 and 1510. Likewise the aggregators may be integrated within a server, computer, or electronic or communication device.

Next, the system 1000 includes a protected network 1600. The protected network 1600 may include a server such as an email-server, computer, switch, gateway, router, database server, file server, mail server, print server, web server, or other electronic or computing device capable of directing the data to the destination device 1700. Finally, a destination device 1700 is coupled to the protected network 1600. The destination device 1700 may include an electronic communication or computing device such as a smartphone, tablet, fixed personal computer, mobile computer, or any communication device that enables one computer or electronic device to communicate with one another.

Figure 2:
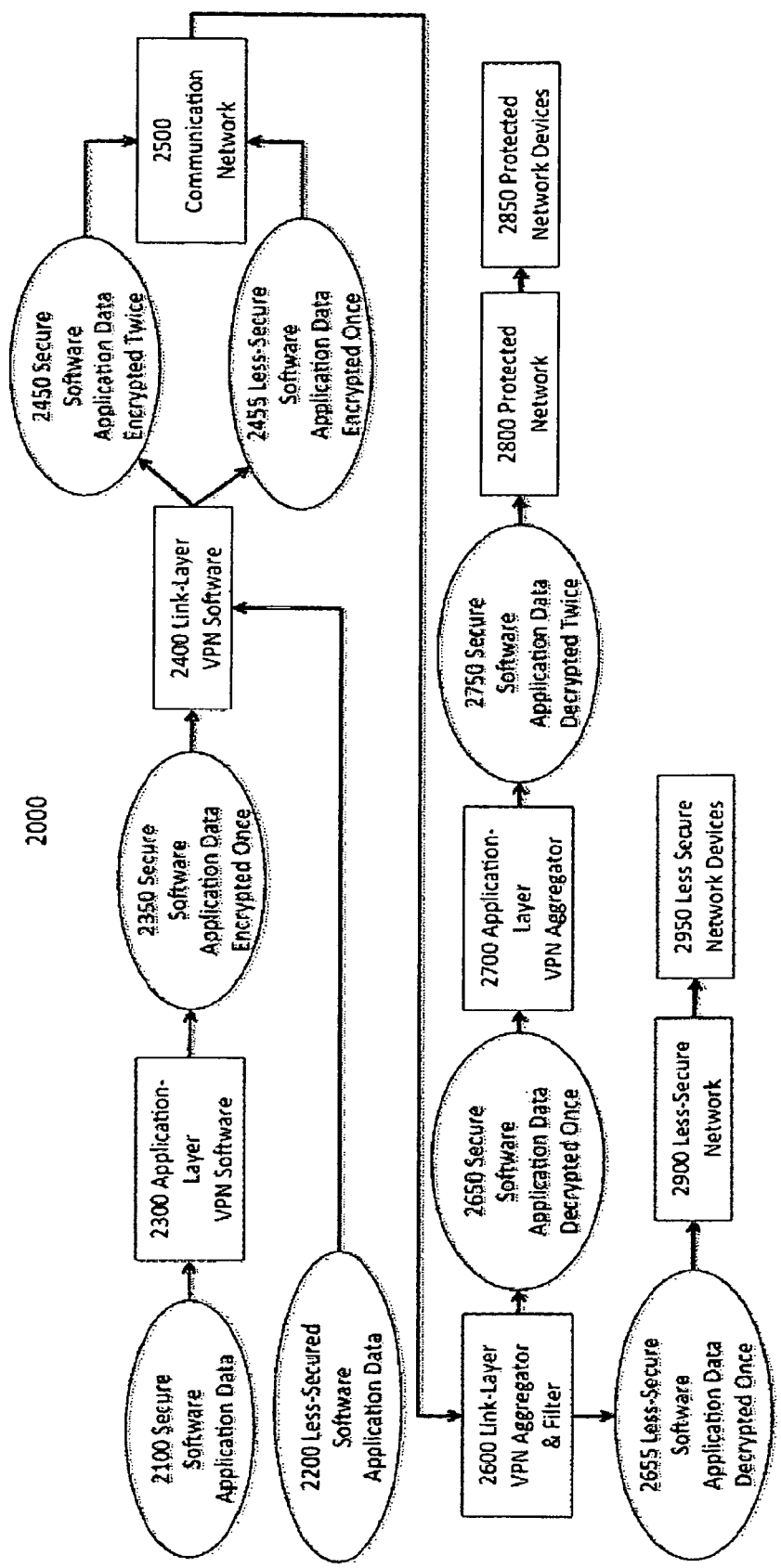
FIG. 2 is a diagram of an exemplary embodiment illustrating the path for multi-wrapped VPN enabled-data compared to typical data with single-wrapped VPN transmitted across a communication network from a device to a remote protected network in accordance with the teachings of the present invention.

FIG. 2 is a diagram illustrating the data path of a multi-wrapped VPN enabled-data packet 2450 compared to a single-wrapped VPN data packet 2455. Data transmitted from the secure application 2100 is first encrypted by the application-layer VPN software 2300 and then again by the link-layer VPN software 2400 before being transmitted out of the device and into the communication network 2500. Next the multi-wrapped VPN enabled-data packet 2450 is received by the link-layer VPN aggregator 2600 where the link-layer VPN aggregator 2600 performs the inverse to the link-layer VPN software's encryption algorithm. The link-layer VPN aggregator 2600 also filters the data and sends completely encrypted data 2655 to the less-protected network device 2950 and the once-encrypted data packet 2650 to the application-layer VPN aggregator 2700. Next the once-encrypted data packet 2650 is received by the application-layer VPN aggregator 2700 where the application-layer VPN aggregator 2700 performs the inverse to the application-layer VPN software's encryption algorithm. The application-layer VPN aggregator 2700 then sends the decrypted data 2700 to the protected network 2800.

The data from the less-secured software application 2200 is transmitted directly to the link-layer VPN software 2400 before being sent out of the device and into the communication network 2500. The data from the less-secured software application 2200, however bypasses the application-layer VPN software 2300. Next the single-wrapped VPN data packet 2455 is received by the link-layer VPN aggregator 2600 where the link-layer VPN aggregator 2600 performs the inverse to the link-layer VPN software's encryption algorithm. The link-layer VPN aggregator 2600 filters all of the data and sends all data completely encrypted 2655 to the less-protected network 2500 and onto the less-protected network device 2950.

This invention allows data packets from multiple software applications to be encrypted with different encryption levels more efficiently. Data from less-secured applications 2200 only need to be encrypted once before leaving the device and decrypted a single time after going through the communication network 2500. The less-secured data is also prevented from entering the protected network because it would lack the proper authentication information. This application also enables a commercial off the shelf ("COTS") software applications and devices to be used for more secured operations. For example, the multi-wrapped VPN enabled-data allows a COTS device to be used to transmit more secured data using the multi-wrapped VPN technology.

Figure 3:
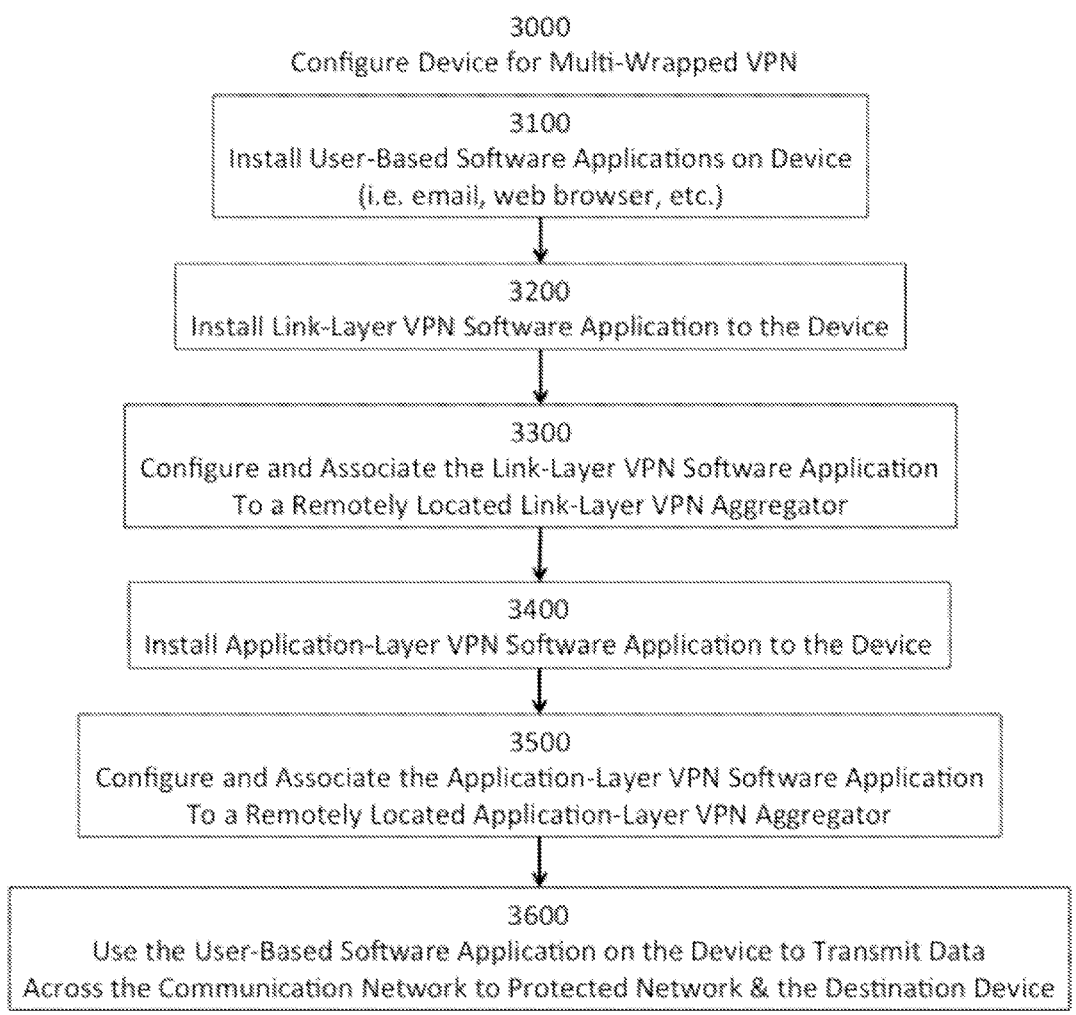
FIG. 3 is a diagram of an exemplary embodiment for a process for configuring a device to transmit multi-wrapped VPN enabled-data across a communication network in accordance with the teachings of the present invention.

FIG. 3 is a diagram of an exemplary embodiment for a process 3000 to configure a device to enable a multi-wrapped VPN to transmit data across a communication network comprising installing 3100 user-based software applications on the device. Next a link-layer VPN software application is installed 3200 on the device. Next the link-layer VPN software is associated and configured 3300 to a remotely located link-layer VPN aggregator. Next an application-layer VPN software application is installed 3400 onto the device. The application-layer VPN software is configured and associated 3500 with an application-layer VPN aggregator.

The VPN software applications are configured with identifying information such as the communication protocols, server names, IP addresses, remote port numbers, etc. for the associated aggregators and devices. These configuration steps may be auto-configured on the device, or provisioned by a network administrator. Finally, the user-based software application on the device can be used to transmit 3600 data across the communication network with the multi-wrapped VPN.

FIG. 4 is a diagram of an exemplary embodiment for a process to establish a multi-wrapped VPN to transmit data across a communication network from a device to a remote protected network comprising transmitting 4100 data from a user-based software application to an application-layer VPN software application. The application-layer VPN software is configured to encrypt data from any of the user-based software applications that are configured to redirect all data transmissions to the application-layer VPN software—thus making the user-based application software a secure application. The application-layer VPN software may be installed in either root or user space; however it is more advantageous to exist in user space since root, or elevated access, is not required. Applications in user space can be installed, uninstalled, updated and configured more readily than applications installed in root space. The application-layer VPN software is not a link-layer VPN. In other words, the application-layer VPN is associated with specific user-based applications and does not encrypt and forward all of the device's data traffic.

Next the application-layer VPN software encrypts 4200 the data including the destination information for the data such as a destination device's IP address and network connection information. The data encryption is accomplished using a data encryption process that converts a plaintext message into cipher text that can be decoded back into the original message, such as the block or stream cipher based encryption schemes.

Next, the application-layer VPN software sends 4300 the once-encrypted data to the local network interface. A link-layer VPN software application captures all data transmitted through the local network interface. The link-layer VPN software captures all data transmitted to and from the device via the local network interface. The link-layer VPN software encrypts 4400 all data traffic leaving the device, including the data already encrypted by the application-layer VPN software. The data encryption is accomplished using a data encryption process that converts a plaintext message into cipher text that can be decoded back into the original message, such as the block or stream cipher based encryption schemes.

Next, the link-layer VPN software sends 4500 the twice-encrypted data across a communication network. The communication network may be a wired or wireless communication network. The communication network may include a public or private network such as the Internet, intranet, telecommunications system, or other network capable of transmitting electronic data.

Next, a link-layer VPN aggregator is coupled to the communication network. The link-layer VPN aggregator receives the twice-encrypted data and inverses 4600 the encryption performed by the link-layer VPN software. Next, the link-layer VPN aggregator filters 4700 the data sending data completely decrypted onto its destination device. Data packets that are still encrypted are sent to the application-layer VPN aggregator. The application-layer VPN aggregator receives the once-encrypted data and inverses 4800 the encryption performed by the link-layer VPN software.

Each aggregator includes a cryptographic engine consisting of hardware and, or software that utilizes a data encryption algorithm to secure data from unauthorized access. The aggregators may include a stand-alone module consisting of the necessary algorithm data path and a control processor chips and associated software. Likewise the aggregators may be integrated within a server, computer, or electronic or communication device. The aggregators first authenticate the data as one from a known and trusted source then it transforms the encrypted data using a decryption algorithm, or a key, to make the data readable. With the decrypted data, the aggregators are able to identify the data's final destination information such as a destination device's name, IP address, port number, and device authentication information. If decryption of authentication fails, the encrypted data packet may be dropped.

The aggregators use the data's destination information to initiate a connection to the next aggregator, or the protected network. The VPN aggregator coupled to the protected network will also track the connection to the protected network and associate it with the device's destination information such as the IP address and local port number to facilitate communication back to the device. Once the connection to the next device, i.e. either the next aggregator or the protected network, is established, the aggregator sends the decrypted data to the next intended device, either the next aggregator or the protected network. The aggregator coupled to the communication network also filters data sending data entirely decrypted to a device outside the protected network and data still encrypted to the next aggregator for further decryption.

Next, the application-layer VPN aggregator sends 4900 the decrypted data to the protected network for distribution to the destination device. The protected network may include a server such as an email-server, computer, switch, gateway, router, database server, file server, mail server, print server, web server, or other electronic or computing device capable of directing the data to the destination device. The private network determines the device's destination information based on information such as the IP address and local port number and then sends 4950 the data packet onto the destination device. Finally, the multi-wrapped data encryption process is reversible and the destination device can transmit data back through the communication network and to the device.

FIG. 5 is a diagram of an exemplary embodiment for the reversible process 5000 in which the destination device transmits multi-wrapped VPN enabled-data back through the communication network and to the device. This is possible because the destination device keeps track of the return destination information such as the original device and protected network's names, IP addresses, port numbers, and authentication information. Thus the destination device is able to send a decrypted data packet, including the original device's destination information, to the protected network. Next the protected network sends 5800 the decrypted data from the destination device to the application VPN aggregator. Next, the application VPN aggregator receives the decrypted data and encrypts 5700 it once then sends the once-encrypted data to the link-layer VPN aggregator. Next, the link-Layer VPN aggregator receives the once-encrypted data and again encrypts 5600 the data with its encryption algorithms. The twice-encrypted data is then sent 5600 across the communication network and to the device. Next the device receives the twice-encrypted data and diverts all encrypted data to the link-layer VPN software and the link-layer VPN software receives all encrypted data and inverses 5400 the link-layer VPN software encryption. The link-layer VPN software filters the data sending 5300 data to its appropriate next destination. For example, data completely decrypted can be sent to its associated user-based software application and data still encrypted with the application-layer VPN software's algorithm will be sent to the application-layer VPN software for further processing. Next, the application-layer VPN software receives the once-encrypted data and inverses 5200 the application-layer VPN software's encryption. Finally, the completely decrypted data is sent 5100 to the secured user-based software application.

Alternatively, in this embodiment the destination device may also be configured with the application-layer VPN and link-level VPN software. In this scenario, the data encryption would take place using the destination device's own multi-wrapped VPN capability. The multi-wrapped VPN enabled-data, in this case, may still pass through the aggregators but further encryption would not be necessary. An alternate path may also be used in which the protected network sends multi-wrapped VPN enabled-data directly to the device and thus bypassing the aggregators.

Figure 6:
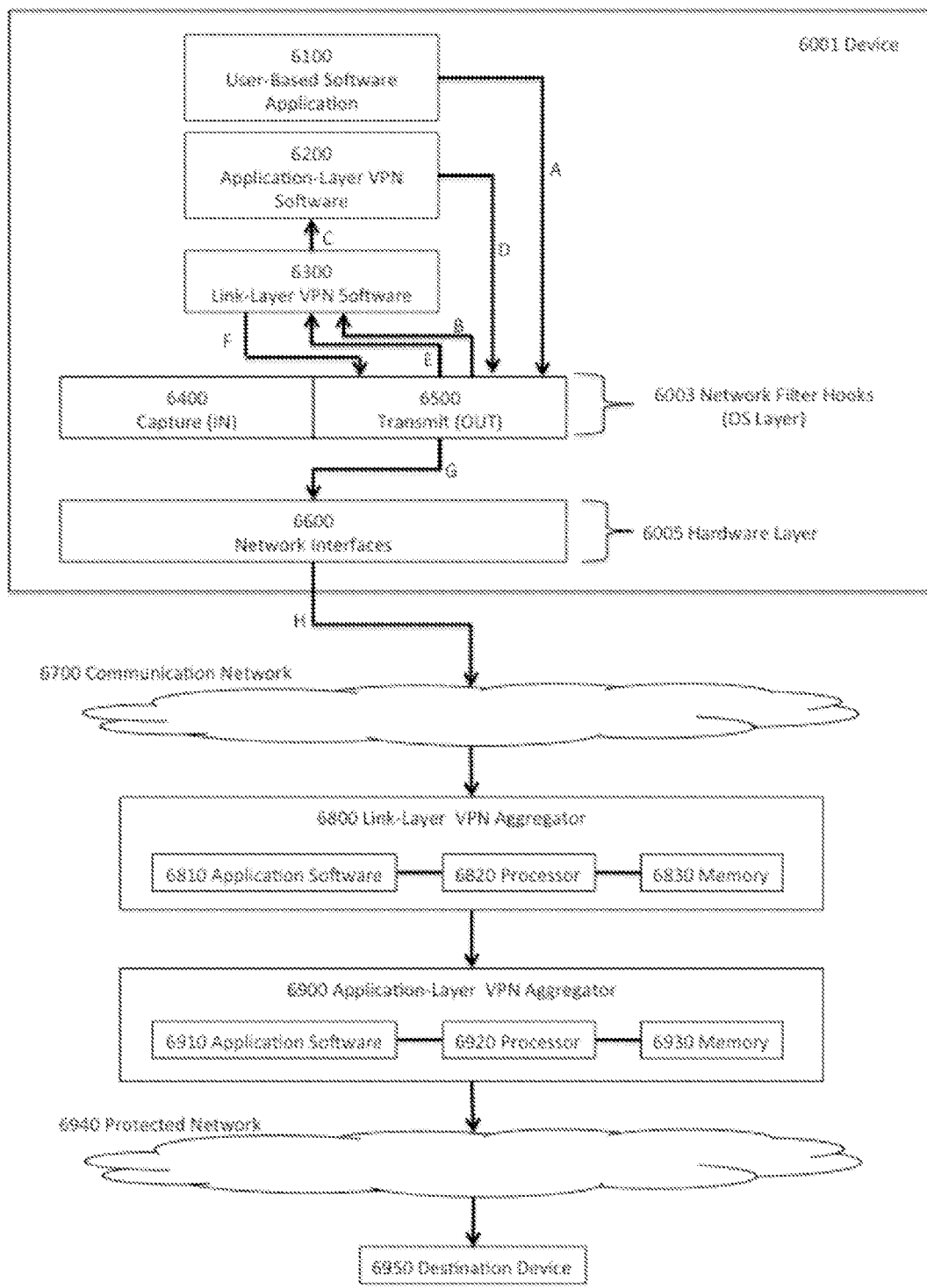
FIG. 6 is a diagram of an exemplary embodiment for a process to transmit multi-wrapped VPN enabled-data across a communication network from a communication device to a remote protected network in accordance with the teachings of the present invention.

FIG. 6 is a diagram of an exemplary embodiment for a process 6000 to transmit multi-wrapped VPN enabled-data across a communication network from a device 6001 to a protected network 6940. This embodiment is similar to the embodiment described in FIG. 1-5, however the first VPN is the link-layer VPN software application 6300. This embodiment first comprises transmitting data from a user-based software application 6100 to a link-layer VPN software application 6300. The link-layer VPN software 6300 captures all data leaving the device 6001 for encryption. For example, when a user-based software application attempts to transmit data out of the device via the network interfaces, the network filter hooks 6003 within the OS layer detects the transmission and diverts the data to the link-layer VPN software 6300. Eventually the data gets reconnected with the transmit 6500 network filter hook 6003 and allowed to transmit via the network interfaces 6600 to the communication network 6700.

After encrypting the data from secure user-based software application 6100, the link-layer VPN software 6300 redirects all encrypted traffic to the application-layer VPN software application 6200 via a dedicated local port. The application-layer VPN software 6200 is only associated with a single local port on the network stack, and unlike the link-layer VPN software 6300 it does not attempt to capture all data packets—the application-layer VPN software 6200 only captures data that is associated and configured with. The application-layer VPN software 6200 encrypts the data a second time. Next, the application-layer VPN software 6200 attempts to send the twice-encrypted data out of the network. Since the link-layer VPN software 6300 is configured to intercept all data leaving the device 6001, the link-layer VPN software 6300 intercepts the data again via the network filter hooks 6003 and inspects the data to determine if the source is the application-layer VPN 6200. This is done to avoid an infinite loop in which the data would continuously transfer through the network filter hooks 6003 and through the link-layer VPN software 6300 and again through the application-layer VPN software 6200. When the link-layer VPN software 6300 detects that the data has already passed through the application-layer VPN software 6200, the data is sent out through the network filter hook 6003 transmit 6500 with instructions to transmit directly to the network interfaces 6600 and out to the communication network 6700. Alternatively, the application-layer VPN 6200 may send the multi-encrypted data directly to the link-layer VPN software 6300 via a local port that detects the data incoming on the port that is associated with the application-layer VPN 6200.

Next, a link-layer VPN aggregator 6800 is coupled to the communication network 6700. The link-layer VPN aggregator 6800 receives the encrypted data and inverses the encryption performed by the link-layer VPN software 6300. Next, the link-layer VPN aggregator 6800 filters the data sending the completely decrypted data to its destination device and sends the data that was multi-wrapped to the application-layer VPN aggregator 6900. Next, the application-layer VPN aggregator 6900 receives the data that is still encrypted and inverses the encryption performed by the application-layer VPN software. Next, the application-layer VPN aggregator 6900 sends the decrypted data onto the protected network 6940 to the destination device 6950. Each aggregator includes a cryptographic engine consisting of hardware and, or software that utilizes a data encryption algorithm to secure data from unauthorized access. The aggregators may include a stand-alone module consisting of memory 6830, a control processor 6920, and associated software 6810. Likewise the aggregators may be integrated within a server, computer, or electronic or communication device. The aggregators first authenticate the data as one from a known and trusted source then it transforms the encrypted data using a decryption algorithm, or a key, to make the data readable. With the decrypted data, the aggregators are able to identify the data's final destination information such as a destination device's name, IP address, port number, and device authentication information. If decryption of authentication fails, the encrypted data packet may be dropped.

The link-layer VPN aggregator 6800 uses the data's destination information to initiate a connection to the application-layer VPN aggregator 6900. The application-layer VPN aggregator 6900 will also track the connection to the protected network 6940 and associate with the device's destination information such as the IP address and local port number to facilitate communication back to the device 6001. Once the connection to the next device, i.e. either the next aggregator or the protected network 6940, is established, the aggregator sends the decrypted data to the next intended device, either the next aggregator or the protected network 6940. The link-layer VPN aggregator also filters data sending data entirely decrypted to a device outside the protected network and data still encrypted to the application-layer VPN aggregator 6900 for further decryption. After decrypting the data, the application-layer VPN aggregator 6900 sends the data to the protected network 6940.

Next, the protected network 6940 forwards the decrypted data to the destination device 6950. Finally, the double-wrapped data encryption process is reversible and the destination device 6950 can transmit data back through the communication network 6940 and to the device 6001.

Figure 7:
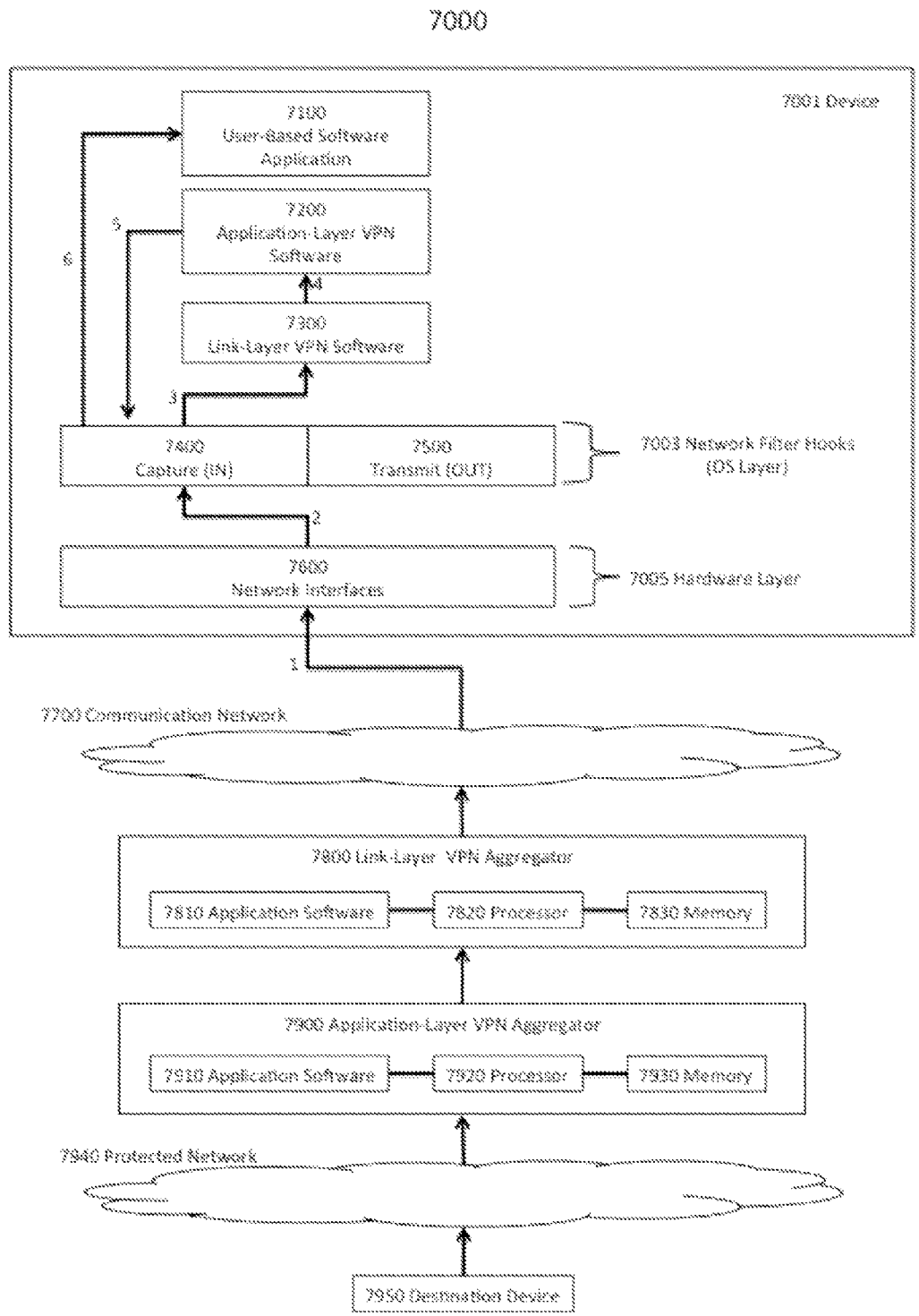
FIG. 7 is a diagram of an exemplary embodiment for a process for receiving multi-wrapped VPN enabled-data transmitted across a communication network to a communication device from a remote protected network in accordance with the teachings of this invention.

FIG. 7 is a diagram of an exemplary embodiment for a process 7000 in which the destination device 7950 transmits multi-wrapped VPN enabled-data back through the communication network 7700 and to the device 7001. This is possible because the destination device 7950 keeps track of the return destination information such as the original device and protected network's 7940 IP addresses and local port numbers. Thus the destination device 7950 is able to send a decrypted data packet, including the original device's 7001 destination information, to the protected network 7900. Next the protected network 7940 sends the decrypted data from the destination device 7950 to the application-layer VPN aggregator 7900. Next, the application-layer VPN aggregator 7900 receives the decrypted data and encrypts it once then sends the once-decrypted data to the link-layer VPN aggregator 7800. Next, the link-Layer VPN aggregator 7800 receives the once-decrypted data and again encrypts the data with its encryption algorithms. The twice-encrypted data is then sent across the communication network 7700 and on to the device 7001. Next the device 7001 receives the twice-encrypted data via the network interfaces 7600. The data is intercepted at the capture 7400 network filter hook 7003 in the OS layer and sent to the link-layer VPN software 7300. Next the link-layer VPN software 7300 receives the encrypted data and inverses the link-layer VPN aggregator software 7900 encryption. The link-layer VPN software 7300 filters the data sending the data to its appropriate next destination. For example, data completely decrypted can be sent to its associated user-based software application and data still once-encrypted with the application-layer VPN aggregator 7900 encryption algorithm will be sent to the application-layer VPN software 7200 for further processing. Next, the application-layer VPN software 7200 receives the still once-encrypted data and inverses the application-layer VPN aggregator 7900 encryption. Finally, the completely decrypted data is reinserted back to the capture 7400 network filter hook 7003 in the OS layer and then on to the secured user-based software application 7100.

Alternatively, in this embodiment the destination device 7950 may also be configured with the application-layer VPN and link-level VPN software so the data encryption can take place using the destination device's 7950 own multi-wrapped VPN capability. The aggregators, in this case, may still filter the multi-wrapped VPN enabled-data, but further encryption would not be necessary. An alternate path may also be used in which the protected network sends multi-wrapped VPN data directly to the device and thus bypassing the aggregators.

The embodiments of this invention are especially applicable to standard Android-based devices and software applications because Android devices have limited data encryption capabilities due to the need to have elevated permissions such as root permissions to install data encryption software. This invention overcomes this issue and does not require root permissions to install and configure non-secure applications with data encryption capabilities. The embodiments of this invention provide a method and system to establish a virtual private network ("VPN"), or a secured and protected network. This invention enables user's of Android-based communication devices to use COTS software applications without the need to add security features to the applications. In other words, this invention provides secure and authenticated data transmission from a communication device to any public or private network while using existing standard applications such as email, VoIP, internet browsers, ISR applications, video conferencing, telecommuting, inventory tracking and control, etc. This invention provides the opportunity to selectively further secure one or more existing applications with configuration changes that can be made at the user-space level of the software stack.

Throughout this description, references were made to components of the system coupled together in a manner that allows the exchange and interaction of data, such that the operations and processes described may be carried out. For example, the components may be coupled with electrical circuitry, or through wireless networks that allow the devices to transfer data, receive power, execute the operations described, and provide structural integrity. The invention may also be enabled with more components than described in the specification. For example, any number and combination of devices, user-based software applications, communication networks, aggregators and destination devices may be utilized to enable and scale out this invention.

For example, the invention may include many software applications each associated with a unique application-layer VPN software to encrypt and decrypt data. Next, the many application-layer VPN software applications may be associated to as few as one link-layer VPN software application to perform a second encryption operation on the first encrypted data. And across the communication network, each encrypted data packed may be first decrypted by the associated unique application-layer VPN aggregator. Thus each encrypted data packet may be decrypted by one of many application-layer VPN aggregators and then again by a single link-layer VPN aggregator.

The terms and expressions, which have been employed herein, are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. A method for transmitting a data set across a communication network from a first device to a remote protected network comprising:
    transmitting the data set derived from a user-based software application installed in the first device to an application-layer VPN program;
    encrypting the data set with an application-layer VPN program to produce an encrypted data set;
    sending the encrypted data set to a local network interface;
    capturing the encrypted data set transmitted to the local network interface with a link-layer VPN program;
    encrypting the encrypted data set again with the link-layer VPN program before the encrypted data set leaves the device yielding a multi-encrypted data set;
    sending the multi-encrypted data set across the communication network;
    receiving the multi-encrypted data set with a link-layer VPN aggregator device which is coupled to the communication network and inversing the encryption performed by the link-layer VPN program to yield the encrypted data set;
    using the link-layer VPN aggregator device to send the encrypted data set to an application-layer VPN aggregator device;
    receiving the encrypted data set with the application-layer VPN aggregator device and inversing the encryption performed by the application-layer VPN program to yield the data set; and
    sending the data set to a destination device via the remote private network.

2. The method of claim 1, wherein the application-layer VPN program and the link-layer VPN program are configured with identifying information comprising a communication protocol, a server name, an internet protocol (IP) address, a remote port number for the application-layer aggregator device, the link-layer aggregator device, and the first device.

3. The method of claim 1, wherein the application-layer aggregator device and the link-layer aggregator device first authenticate the encrypted data set and the multi-encrypted data set, respectively, as originating from a known and trusted source prior to transforming the encrypted data set and the multi-encrypted data set, respectively.

4. The method of claim 3, wherein the encrypted data set or multi-encrypted data set is dropped if the application-layer aggregator device or the link-layer aggregator device is unable to authenticate that the encrypted data set and the multi-encrypted data set, respectively, originates from the known and trusted source.

5. The method of claim 1, wherein the application-layer VPN aggregator device and the link-layer VPN aggregator device track a connection to the remote protected network and associates the connection between the first device and the destination device using information including an IP address and a local port number.

6. The method of claim 1, wherein the destination device can transmit a new set of data back through the communication network and to the first device.

7. A method for transmitting a data set across a communication network from a first device to a remote protected network comprising:
    transmitting the data set from a user-based software application on the first device to a link-layer VPN application;
    using the link-layer VPN application to capture the data set leaving the first device and encrypting the data set to yield an encrypted data set;
    using the link-layer VPN application to redirect the encrypted data set to the application-layer VPN application via a dedicated local port;
    using the application-layer VPN application to encrypt the encrypted data set a second time yielding a twice-encrypted data set and send the twice-encrypted data set out to the communication network;
    using a link-layer VPN aggregator device coupled to the communication network to receive the twice-encrypted data set and inversing the encryption performed by the link-layer VPN application yielding the encrypted data set;
    using the link-layer VPN aggregator device to send the encrypted data set to an application-layer VPN aggregator device;

using the application-layer VPN aggregator device to receive the encrypted data set and inverse the encryption performed by the application-layer VPN application to yield the data set; and using the application-layer VPN aggregator device to send the data set onto a destination device via the remote private network.

8. The method of claim 7, wherein the application-layer VPN application sends the twice-encrypted data set directly to the link-layer VPN application via a local port that detects all data incoming on the local port associated with the application-layer VPN application.

9. The method of claim 7, wherein a network filter hook within an OS layer of a software stack detects the transmission of the data set from the user-based software application, and diverts the data set to the link-layer VPN application, with the encrypted data set getting connected to a transmit network filter hook and transmitted via a network interface to the communication network.

10. The method of claim 7, wherein the application-layer VPN application is associated with a single local port on a network stack and the application-layer VPN application only captures the data set that is associated and configured with the single local port.

11. The method of claim 7, wherein the destination device keeps track of return destination information suitable to identify the first device and protected network.

12. The method of claim 7, wherein the destination device transmits a twice-encrypted data set back through the communication network and to the first device.

13. The method of claim 12, wherein the first device intercepts the twice-encrypted data set at a capture network filter hook in an OS layer of a software stack and sends the twice-encrypted data set on to the link-layer VPN application.

14. The method of claim 13, wherein the link-layer VPN application decrypts the twice-encrypted data set yielding the encrypted data set followed by the application-layer VPN application decrypting the encrypted data set yielding the data set followed by the data set being reinserted back to the capture network filter hook such that the data set is sent on to the user-based software application.

15. The method of claim 7, wherein the application-layer VPN application is associated with a single local port on a network stack, so the link-layer VPN application only needs to monitor the single local port.

16. The method of claim 7, wherein the link-layer VPN application inspects the data set transmitted out of the first device and when the data set is determined to have been transmitted by the application-layer VPN application, the data set is further transmitted to the communications network via a network interface.

* * * * *